United States Patent

[11] 3,621,363

[72] Inventors Sven N. J. Ginnman
Gottsunda 2,180 20, Akers Runo;
Per E. C. Udden, Nygatan 1,861 00, Timra,
both of Sweden
[21] Appl. No. 866,270
[22] Filed Oct. 14, 1969
[45] Patented Nov. 16, 1971
[32] Priorities Oct. 16, 1968
[33] Sweden
[31] 13938/68;
Mar. 19, 1969, Sweden, No. 3788/69

[54] AN ARRANGEMENT FOR PREMAGNETIZING A STATIC DC CONVERTER
4 Claims, 15 Drawing Figs.
[52] U.S. Cl. .................................................. 321/2,
321/11, 321/45 R
[51] Int. Cl. .................................................... H02m 3/32
[50] Field of Search ........................................... 321/2, 11,
43–45; 336/110

[56] References Cited
UNITED STATES PATENTS
| | | | |
|---|---|---|---|
| 2,856,578 | 10/1958 | Coleman et al. | 336/110 |
| 3,518,526 | 6/1970 | Genuit | 321/2 |
| 3,526,823 | 9/1970 | Genuit | 321/2 |
| 2,967,989 | 1/1961 | Eno et al. | 321/2 |
| 3,133,241 | 5/1964 | White | 321/45 |
| 3,432,737 | 3/1969 | Hunter et al. | 321/2 |
| 3,504,263 | 3/1970 | Schaefer | 321/2 |

Primary Examiner—William H. Beha, Jr.
Attorney—Fred C. Philpitt

ABSTRACT: The invention relates to a DC converter for transforming a DC voltage to an AC voltage of high frequency and including one or several switching means to effect this operation. The invention is specifically related to the use of premagnetization means for magnetizing the transformer core in order to increase the efficiency of the converter. This is effected by premagnetizing the core into saturation with a magnetic field which is opposite to the field generated by the current through the corresponding switching means. The transformer core will consequently operate in its saturated state from the point when the switching means is rendered conductive and the current through said switching means is increasing up to a certain value above which the core will operate in its nonsaturated state. This arrangement will provide a converter operating with substantially rectangular waveforms of the current supplied to the load, which means that the switching means can operate just below their maximum permissible current when energy is transferred from the current source to the load. The switching means will thus be utilized at a maximum thereby improving the efficiency of the converter.

AN ARRANGEMENT FOR PREMAGNETIZING A STATIC DC CONVERTER

A DEVICE IN A STATIC DC CONVERTER

The present invention relates to a device in a static DC converter comprising means for converting the supplied DC voltage to an AC voltage of high frequency, a transformer for transforming the AC voltage of high frequency into a suitable operating voltage and means for rectifying the AC voltage thus transformed.

DC converters are well-known in the art and used either only as converters or as converters with controlled DC outputs. All these different kinds of DC converters are, however, less effective and suitable for the conversion of high power at high frequencies, while they consume great power and have very limited controlling efficiency. Moreover, these known converters require extremely expensive components such as rapid rectifying means on the secondary side of the transformer.

The object of the present invention is to provide a controllable DC converter with extremely low-power dissipation and a wide controlling range. Moreover, the converter according to the invention does not require any rapid rectifiers or expensive power switches. Nor could the converter according to the invention be destroyed by short circuit of the output.

The improved converter according to the invention is extremely advantageous in applications related to electric welding, especially short-arc-welding and pulse-arc-welding but it could also preferably be used in connection with battery-charging equipments. In welding technique of the kind mentioned above the progress of the welding operation is discontinuous and could be separated in two different modes of operation. During the first mode the workpiece is heated by the arc and during the second mode a drop of the filament additive material is melted away when the current is flowing through the filament, which then will be resistively heated. The transitions between these two modes of operation are critical and difficult to control. The arc often extinguishes and the additive material often splashes. Up til now, these difficulties have been adequately overcome by series and parallel connection of inductive, resistive and capacitive means. However, such elements are often very expensive and space consuming and one further object of the present invention is to eliminate these components without deteriorating the operation of the welding apparatus thereby also reducing weight and volume of the equipment. However, the apparatus according to the invention has not only the qualities of known welding apparatus to a reduced weight and volume but also exhibits improved characters which enable new and advantageous welding methods. In arc-welding of the kind described above the first mode of operation demands relatively high voltage (about 20 v.) and relatively low current (about 150 a.) while the second mode demands high current (about 300 a.) and a low voltage (about 5 v.). The load character of an apparatus according to the invention is well adapted to these requirements. The invention is consequently extremely well adapted to the welding technique of the above-mentioned kind. According to the invention the transformer core or cores are premagnetized in order to displace the magnetization curve to a position in which the total permeability is low when the intensity of magnetization goes below a certain value and high when it exceeds that value. The current through the switching means of the apparatus thereby receives a substantially rectangular waveform.

This premagnetization could be accomplished in different ways, for instance through permanent magnets forming part of the core or by windings placed on the core. The output power from the converter could be easily controlled by changing the premagnetization of the transformer core.

In a suitable embodiment of the invention the premagnetization of the core could be effected without any permanent magnets or extra windings but by means of a choke coil and a rectifying element which are forming a series circuit with the primary winding of at least one transformer, whereby the voltage drop across the rectifying element causes the premagnetization current to flow.

The object of this embodiment is to spare the core space, which the premagnetization windings require. Moreover, the output power of the apparatus could be easily controlled.

In a further embodiment according to the invention the apparatus contains two switching means each disposed in series with a primary winding of a transformer and triggered with about 180° phase shift in relation to each other.

Some embodiments of the apparatus according to the invention will now be described in detail with reference to the accompanying drawings in which FIG. 1 is a circuit diagram of a static DC converter according to the invention;

Figure 1:
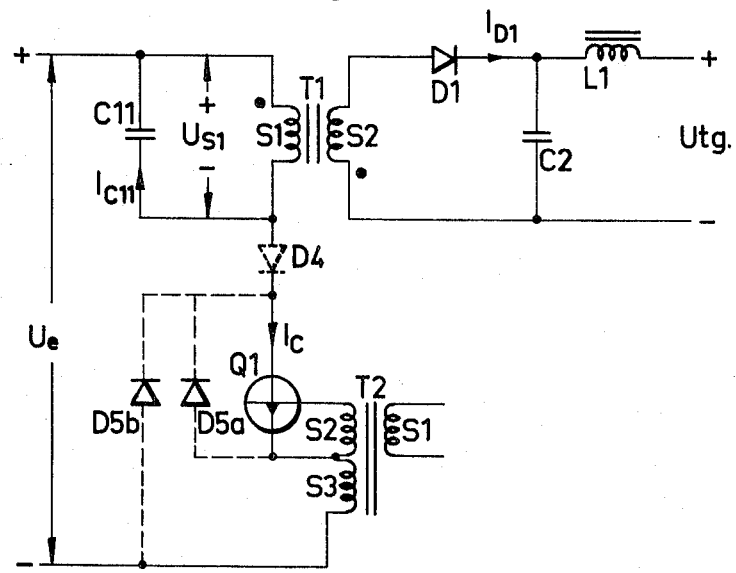

The circuit according to FIG. 1 is connected to an external DC voltage source $U_e$ and comprises a transformer T1 with primary S1 and secondary S2 windings. A capacitor C11 is connected in parallel across the transformer T1, which in turn is serially connected with a switching device, in this embodiment constituted by a transistor Q1. The base of the transistor is connected to a secondary winding S2 of a second transformer T2 having a primary winding S1 which is connected to an external triggering circuit of conventional type, not shown in the Figure. The output voltage of the transformer T1 is rectified by means of a diode D1 and smoothed by means of a capacitor C2 and choke coil L1.

Figure 6:
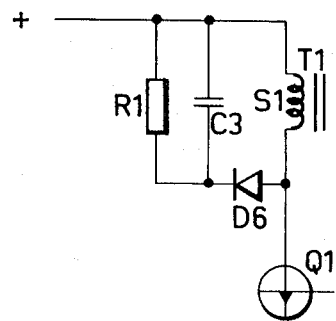
FIG. 6 is a detailed view of safety circuit to protect the transistor in the converter according to FIGS. 1–3.

The circuit according to FIG. 1 operates in the following way:

At instant 1 (FIG. 4) transistor Q1 is rendered conducting by means of base current from the secondary winding S2 of transformer T2. A current $I_e$ will then flow through the primary winding S1 of transformer T1 and the current will be continuously increased since the transformer core operates within the nonsaturated area. At instant 2 transistor Q1 is rendered nonconducting and the collector current ceases shortly thereafter. The inductance constituted by the primary winding of the transformer, however, will cause a current $I_{C11}$ to flow in the series circuit formed by the capacitor C11 and the primary winding S1 thereby charging the capacitor during the time interval between instant 2 and instant 3. The capacitor C11 will also prevent overvoltages to occur across the collector-emitter, during the time interval when the collector current is decreasing, which would have destroyed the transistor. Between instants 2 and 3 the voltage $U_{s1}$ across the primary winding S1 will change polarity and reach its minimum value at instant 3. At this instant the voltage across the secondary winding S2 of the transformer T1 is equal to the voltage across the capacitor C2, whereby the diode D1 will be biassed in the leading direction and the current $I_{D1}$ will begin to flow. The current, which is caused by the flux change in the transformer and which formerly charged the capacitor C11, will now be supplied to the load between the outputs of the converter. The capacitor C11 will also at this moment prevent overvoltage across the transistor. This overvoltage is caused by the self-inductance of the primary winding S1 and it could also be attenuated by means of a diode D6 and a capacitor C3 as shown in FIG. 6. The energy emitted from the primary winding S1 will then be stored in capacitor C3, which is discharged through the resistor R1 or some other suitable discharge device, for instance a zener diode. The circuit, as shown in FIG. 6, could preferably be used in the converter according to any of FIGS. 1-3. The ratio of transformation between the primary and the secondary windings of the transformer T1 is determined by the desired operating voltage of the transformer and the output voltage of the secondary winding.

The magnetic energy stored in the transformer core between instants 1 and 2 will be emitted during the time interval between instants 3 and 4. At instant 4 the current through the secondary winding S2 and diode D1 is equal to zero but due to the fact that the diode is not cut off immediately the current will change direction and flow backwards through diode D1 and secondary winding S2 until the diode is recovered and blocks. During the time interval when current is flowing backwards through the diode D1 no considerable voltage drop occurs across the diode, which means that the effect losses are negligible. This contributes to increasing the efficiency of the converter compared to conventional stationary DC converters.

At instant 4 an LC-oscillation starts which changes the polarity of the transformer, whereby the capacitance C is that of capacitor C11 and the inductance L that of the primary winding S1. The faster this LC-oscillation occurs the better the transformer and transistor could be exploited since the time during which this LC-oscillation occurs could be considered as "uneffective time" because no energy is then transmitted. The oscillation, however, will be accelerated due to the fact that magnetic energy was stored in the transformer when current was flowing backwards through the diode D1. A slow rectifying diode is consequently advantageous instead of being a drawback. The change of polarity of the transformer T1 could, however, be accelerated in other ways, which will be described below.

When the transformer voltage is equal to the supply voltage $U_e$ the collector-emitter voltage of the transistor equals zero and the transistor can consequently be rendered conducting without passing any critical operating point. This ends the operating cycle and a new one begins.

If the voltage value across the transformer T1 at instant 4 is lower than the supply voltage $U_e$ the amplitude of the LC-oscillation could not be so great that the collector-emitter voltage of the transistor equals zero. But since the diode D1 is slow this will contribute to increasing the energy taking part in the oscillation and consequently the amplitude of the oscillation. If this amplitude would be so great that the transistor receives negative collector-emitter voltage a diode D5 (see FIG. 1) could preferably be inserted to protect the transistor. Another way to protect the transistor against negative collector current is to connect a diode D4 in series with the transistor thereby also contributing to changing the direction of the current flow through the primary winding S1 more rapidly around instant 1. This depends on the fact that the voltage $U_{s1}$ across the primary winding S1 in this case is permitted to be greater than the supply voltage $U_e$. The connecting of the diode D5 has not this accelerating effect.

Figure 2:
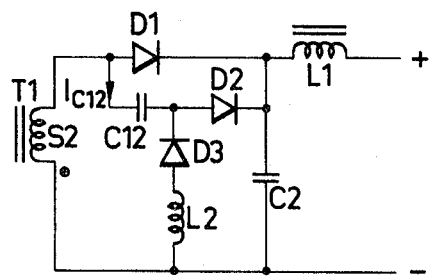
FIG. 2 is an alternative embodiment of the secondary side of the transformer according to FIG. 1.
Figure 3:
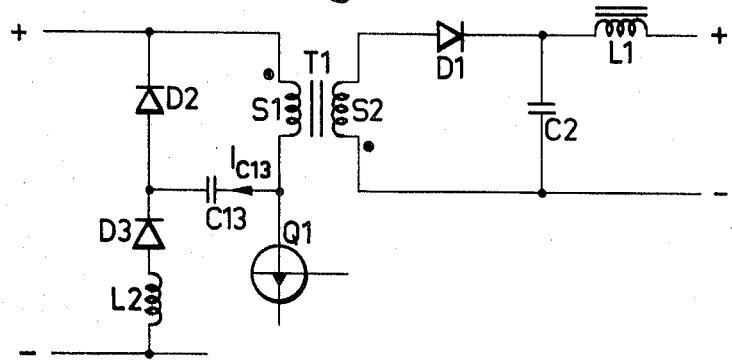
FIG. 3 is a further embodiment of a static DC converter according to the invention.
Figure 5:
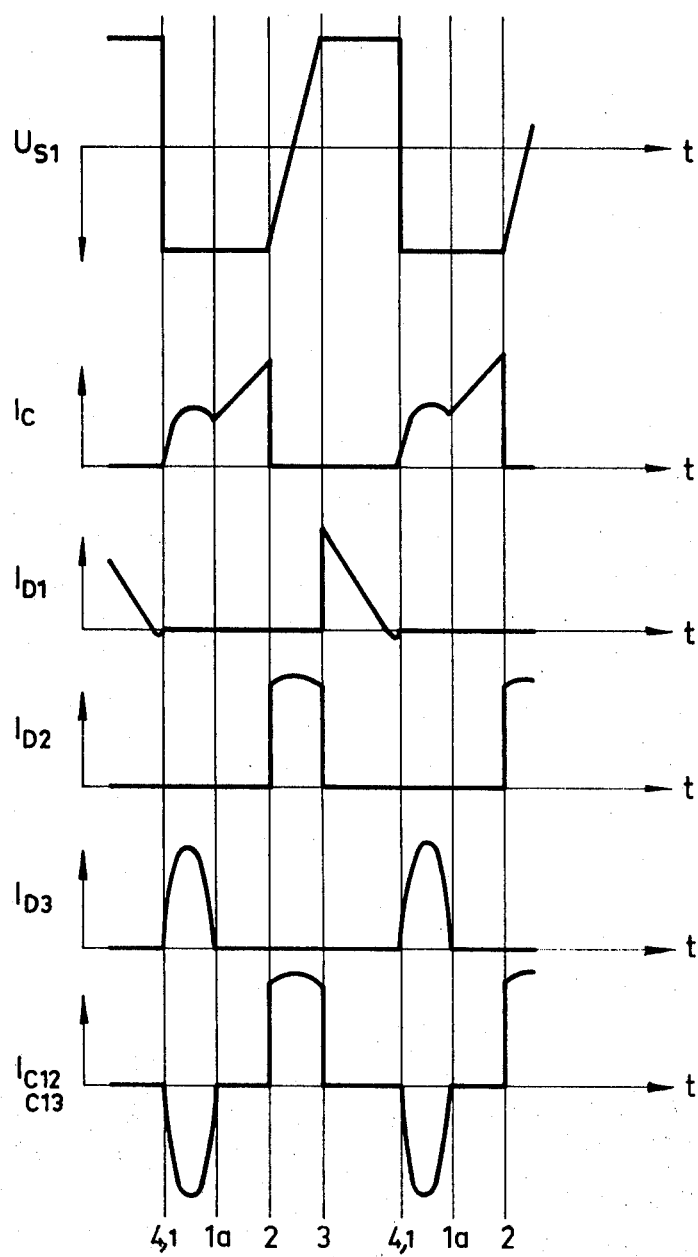
FIG. 5 shows voltage and current curves in stationary converters according to FIGS. 2 and 3.

FIGS. 2 and 3 show two similar methods to accomplish a slow change of the primary voltage $U_{s1}$ between instants 2 and 3 as demonstrated in FIG. 5. The voltage change is attenuated by means of capacitors C12 and C13, respectively, analogous with the attenuation provided by the capacitor C11 as shown in FIG. 1. One difference, however, is that the current through the corresponding capacitors in FIGS. 2 and 3 also flows through a diode D2. Moreover, the converter according to FIG. 1 differs from the converters according to FIGS. 2 or 3 by the fact that the current flowing through the capacitors C12 and C13, respectively, during the time interval between instants 4 and 1a passes another diode D3 and a choke coil L2. This means that the transistor Q1 in the converters according to FIGS. 2 and 3 are rendered conducting already at instant 4 and thereby immediately cause the change of polarity of the transformer without giving rise to any damaging overcurrent through the capacitors C12 and C13, respectively, and the transistor. The current is namely limited by the choke coil L2.

The coil L1 and capacitor C2 in FIGS. 1-3 serve as a filter to smooth the output direct current. However, this filter is not necessary for the operation of the converter. The output with or without filter could be directly connected to a battery or form an arc in a welding equipment or supply some kind of heating device.

One embodiment of the transformer T2, which triggers the transistor Q1 with base current is shown in FIG. 1. The emitter current of the transistor passes a further winding S3, which stands for the main part of the energy supplied to the transformer. The transistor is triggered from an external oscillator via the primary winding S1 of the transformer T2.

The amount of energy transferred by the converter could be substantially improved by utilizing the transistor Q1 and transformer T1 more effectively and a further embodiment of the invention is to provide an improved converter in which this is accomplished.

Figure 8:
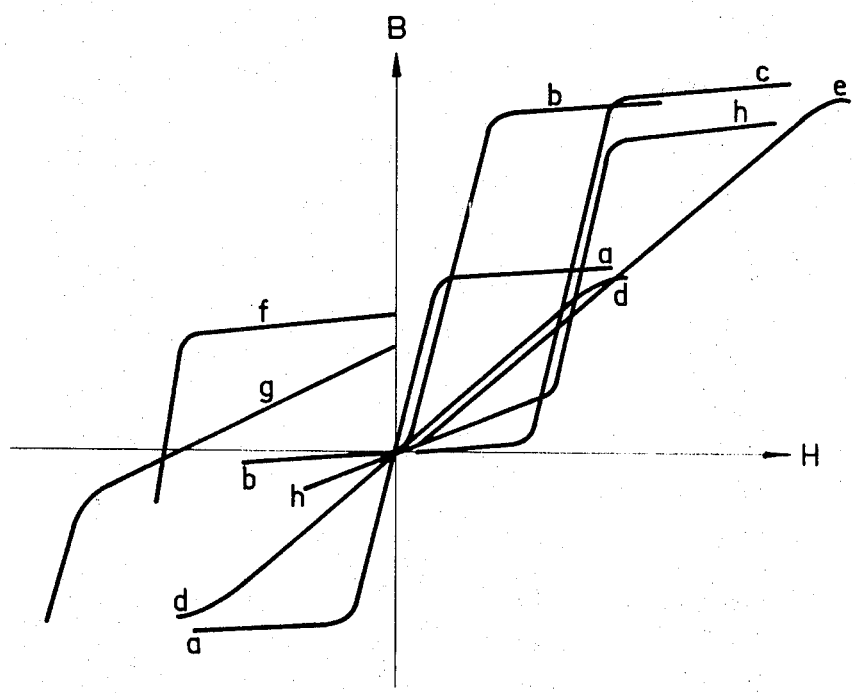
FIG. 8 shows different magnetization curves for premagnetized and unmagnetized cores.
Figure 9:
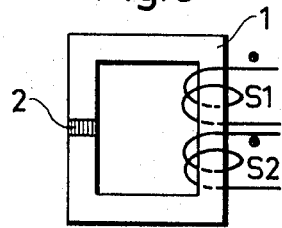
FIGS. 9 and 10 show different arrangements how to premagnetize cores.
Figure 10:
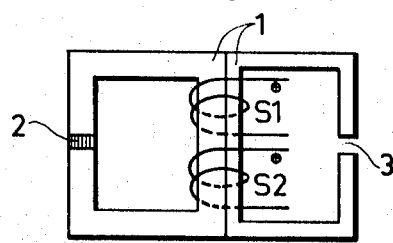
Figure 12:
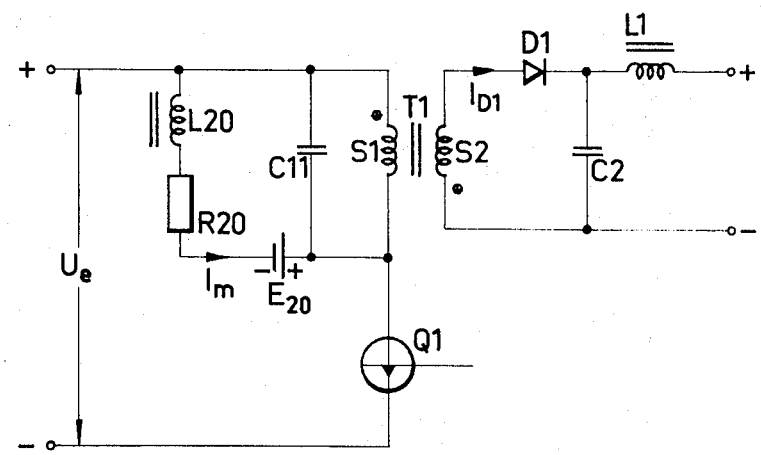
FIG. 12 is a circuit diagram showing the principle how to effect premagnetization with a supplemental voltage source.
Figure 13:
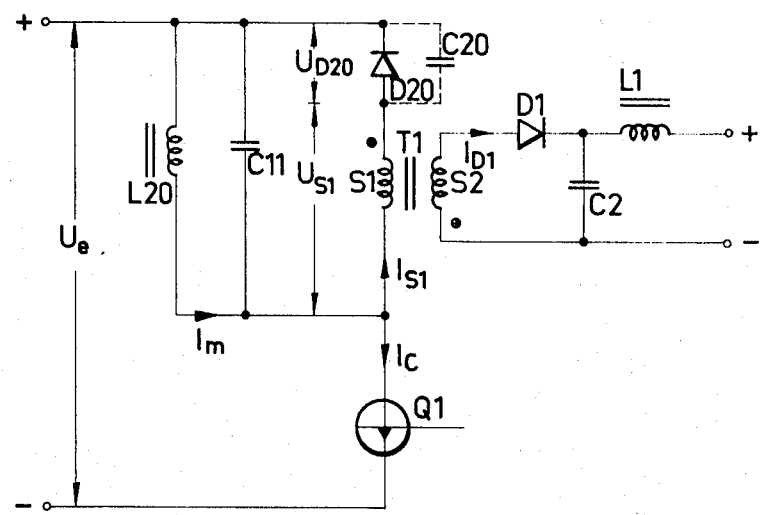
FIG. 13 is a circuit diagram showing how the principle according to FIG. 12 is realized in practice.

FIG. 8 shows magnetization curves of different kinds of magnetic materials in both premagnetized and unmagnetized state. The magnetic qualities for a normal transformer core of steel or ferrite material has substantially the shape of curve $a$ in FIG. 8. If the core is provided with an airgap the curve could be changed to a form substantially like that of curve $d$. According to the invention the core could be premagnetized by means of an extra winding or by inserting a permanent magnet as shown in FIGS. 9 and 10, or by effecting the premagnetization in a way as shown in FIGS. 12 and 13. Thereby the magnetic qualities of the core are changed and the magnetization curves will be that of curves $b$ or $c$ in FIG. 8. Many permanent magnetic materials have magnetic characteristics with the shape of curves $f$ or $g$ in FIG. 8. If a piece of this material 2 is inserted in a soft iron core 1, as shown in FIG. 9, the total permeability of the core is low until the intensity of magnetization exceeds a certain value when the magnetic force increases considerably. Thus, the derivative of the differential permeability is positive in the first quadrant and this quality is effected without magnetizing the core to saturation. The curve $h$ shows the form of the magnetization curve thus derived.

Figure 4:
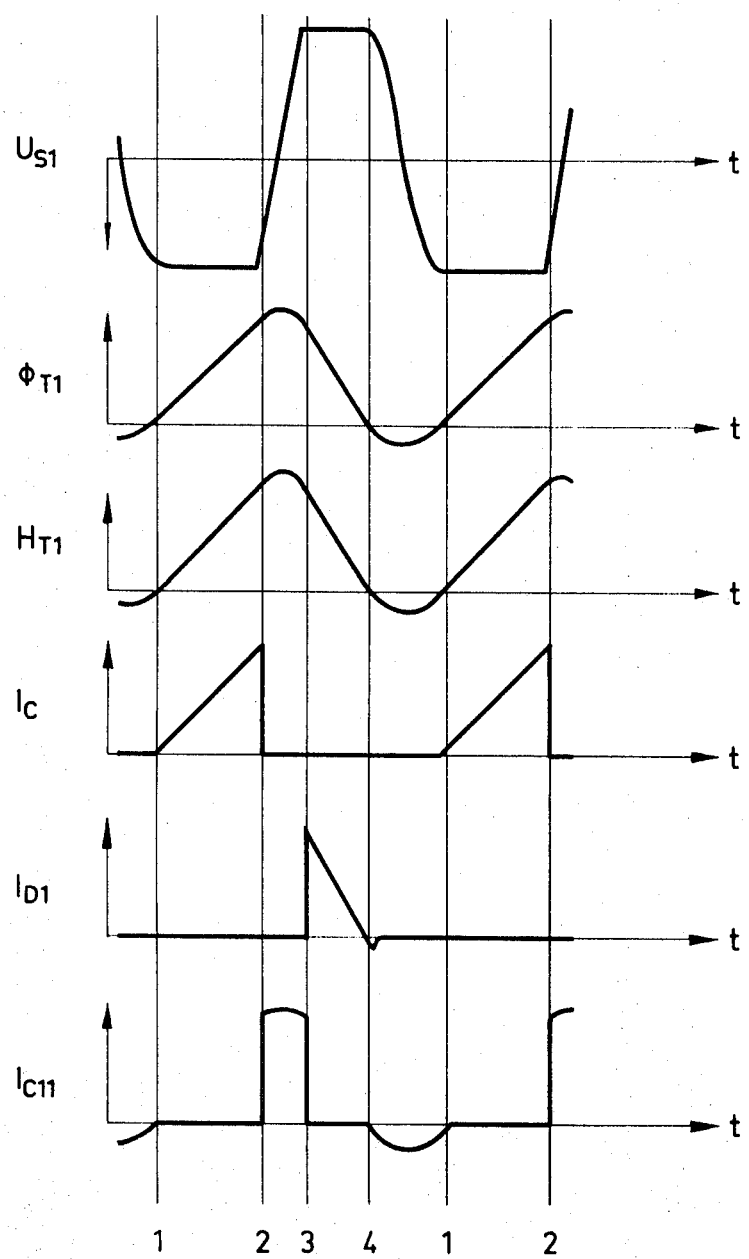
FIG. 4 shows the voltage and current curves in a stationary DC converter according to FIG. 1.

FIGS. 4 and 5 as previously referred to show the different waveforms in converters operating with cores, the magnetic qualities of which substantially correspond to that of curve $d$, which is a normal unpremagnetized core provided with an airgap. In these converters only the linear part of the curve $d$ within the first quadrant is utilized. A magnetization curve $e$ will be derived when premagnetizing a core with an airgap. Such a core could also be used in the converters operating according to FIGS. 4 and 5 but the core only needs to be half as big as that with the normal magnetization curve, since the former has the double operating range within the first quadrant. Consequently the main advantage with this specific embodiment is that the size of the core could be reduced by one half, for instance by inserting a cheap permanent magnet in the soft iron core.

Figure 7:
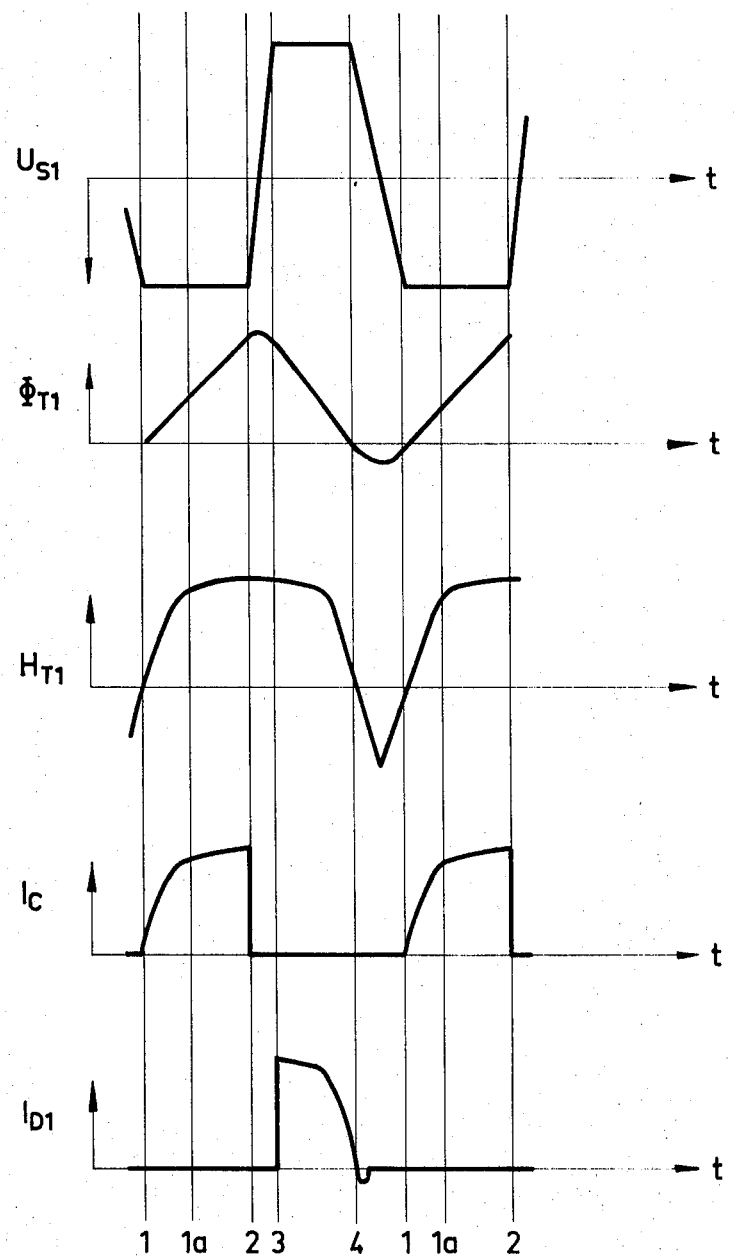
FIG. 7 shows voltage, current and magnetization curves in a DC converter in which the transformer core has been premagnetized.

A core without airgap, which has been relatively strong premagnetized has a magnetization curve according to curves $c$ or $h$ in FIG. 8. The converter will then have the voltage and current waveforms as shown in FIG. 7 and will operate in the following way:

During the increase of magnetic flux which follows immediately after instant 1 the permeability of the core is low which means that the angle between the H-axis and the magnetization curve is very small. The inductance in the primary winding S1 is therefore low during this time interval and the current increases very rapidly. At instant 1a the magnetization flux has increased so that the core has been magnetized to a point in which the derivative of the magnetization curve increases considerably. The inductance in the winding S1 will also increase and the current increases much more slowly and remains substantially at a constant level determined by the strength of premagnetization. Between instants 3 and 4 the current through the diode D1 will also remain substantially constant and not until the end of that time interval the current will be considerably reduced. For the rest the function of the converter will be the same as that previously described.

The derivative of the collector current between instants 1 and 1a could be decreased by completing the core with a non-premagnetized part for instance provided with an airgap 3 as shown in FIG. 10. The premagnetization of the core will cause the transistor to operate with a collector current just below the maximum permissible value during the time interval when energy is transmitted from the current source to the core. The transistor will thus be utilized at a maximum which strongly contributes to improving the efficiency of the converter and the ratio between the output effect and the price of the converter. All previously described embodiments could also be used with cores having different forms of premagnetized cores, as shown on FIG. 8.

The converter operating according to FIGS. 4 and 5 is easily controlled by varying the operating frequency. If, for instance, a lower output effect is desired the transistor Q1 is triggered so that the time interval between instants 1 and 2 will decrease. The collector current $I_c$ will then not be able to reach the same value as before. The maximum current and the means current through the diode D1 will then also be less during the following time interval between instants 3 and 4, which means that the output current will be reduced. Increasing frequency means that the "unefficient time" during instants 2–3 and 4–1 will increase in relation to the effective time. The unefficient time will namely remain constant or increase when the frequency increases with contributes to reducing the output effect. This means that even the converter operating according to FIG. 7 could be controlled by means of frequency variations. A less inclination of the current curve $I_c$ between instants 1 and 1a also means that the current $I_c$ will not have time enough to reach its maximum value when the frequency is high and this could also be utilized to control the output effect.

Another way to control the output effect is to provide the transformer with several secondary windings with different ratios of transformation each being connected to the capacitor C2 or directly to the load via corresponding thyristors. By triggering different thyristors a varying output effect could be achieved. The switching between the different secondary windings can of course be effected by electromechanical means.

The output effect of the device could also be controlled by pulse-width modulation. This is suitably accomplished by self-oscillations between the transformer and capacitors C11, C12 or C13 and stray capacitances some time after instant 4. This is effected by not rendering transistor Q1 conducting after the first change of polarity of the transformer. The time during which the transformer is self-oscillating could be looked upon as unefficient time which means that the means value of the output effect decreases with increasing time of self-oscillation in relation to effective time. The transistor is then suitably rendered conducting at an instant when the transformer voltage is positive and equal to the supply voltage $U_e$. The converter according to FIGS. 2 or 3 could be rendered conducting at any instant of the self-oscillation without risk for destroying the transistor. The output control could also be accomplished by premagnetization of the transformer core to a higher or lower value either by means of a permanent magnet, a separate winding or a self-magnetizing winding as shown in FIGS. 12 and 13.

Figure 11:
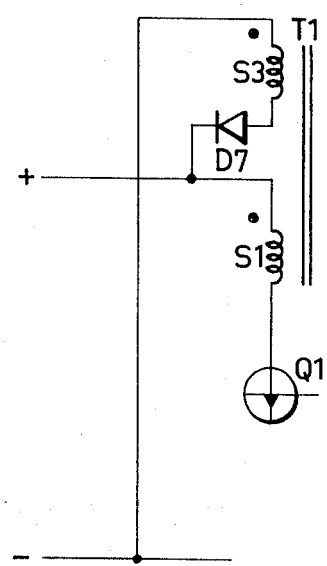
FIG. 11 shows an alternative embodiment of the transformer in the converters according to FIGS. 1–3.

In FIG. 11 the transformer T1 has been provided with a third winding S3. This prevents the voltage across the transformer from being too negative. When the voltage across winding S3 reaches the same value as the supply voltage $U_e$ during the time interval between instants 3 and 4 the diode D7 will be rendered conducting and retransmit the energy stored in the transformer back to the supply source. This limits the negative voltage across windings S1 and S2 as well as the output voltage and the transistor Q1 is protected against overvoltages. According to the invention the coil L1 could be premagnetized for utilizing the core more effectively.

When the winding S3 according to FIG. 11 is used the diode D1 (FIGS. 1–3) could be replaced by a thyristor. Triggering the thyristor at different moments during the time interval between instants 3 and 4 causes variation in the output effect.

As appears from FIG. 12 the transformer T1 is connected in parallel on one hand with the capacitor C11 and on the other hand with a series circuit comprising a choke coil L20 with certain inner resistance represented by the resistor R20 and the voltage source E20 emitting a substantially constant DC current $I_m$ flowing through a circuit constituted by the primary winding S1 of the transformer T1, the choke coil L20 and the resistor R20. The current $I_m$ is thereby depending on the ratio between the voltage across the source E20 and the resistance of the resistor R20. If the transistor Q1 is connected to external triggering means which renders the transistor conducting and nonconducting the inductance of the choke coil L20 will prevent the AC voltage thus derived to affect the current $I_m$ to any considerable extent. The magnetization current $I_m$ can, however, be derived in a way as shown in FIG. 13 in which the supplemental voltage source E20 has been replaced by a diode D20 connected in series with the primary winding S1. Suitably the diode could be connected in parallel with a capacitor C20 or even a resistor. When the converter is oscillating a voltage across the diode D20 occurs which causes the magnetization current $I_m$ to flow and the current is limited by the resistances in the primary winding S1 and the choke coil L20. If the converter has reached stable working conditions in which transient progresses have been attenuated it operates in the following way.

Figure 14:
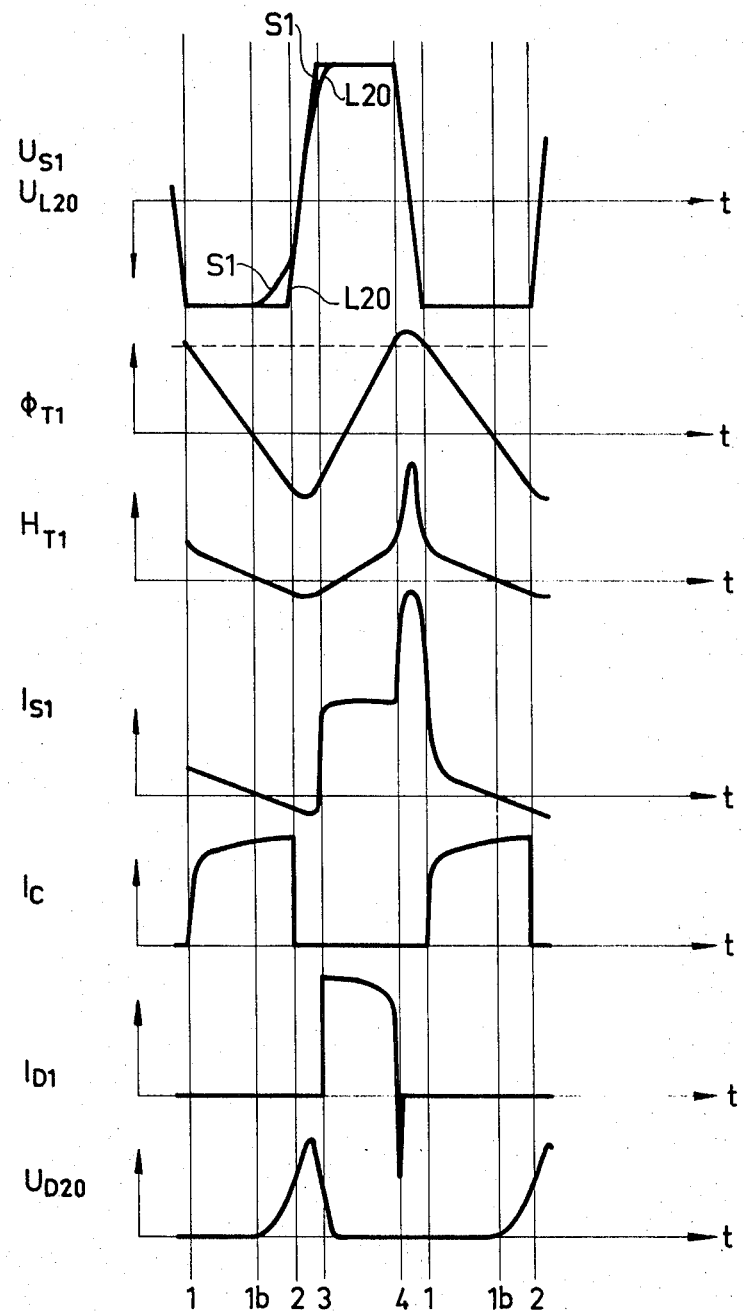
FIG. 14 shows voltage, current and magnetization curves in different branches of the converter according to FIG. 13.

As appears from FIG. 14 a great current $I_{S1}$ is flowing through the primary winding S1 of the saturated transformer core T1 shortly before instant 1. This current, which is greater than the magnetization current $I_m$ causes the polarity across the transformer to change, which means that the transformer voltage $U_{S1}$ goes from a negative to a positive maximum value. At instant 1 the transistor Q1 is rendered conducting whereby the voltage $U_{S1}$ remains positive and the core T1 passes out of its saturated condition so that the current $I_{S1}$ is rapidly reduced. The magnetization current $I_m$ which previously was flowing through the primary winding S1 will instead flow substantially through the transistor Q1 and the transistor current $I_c$ will thus rapidly increase until it is of about the same size as the magnetization current $I_m$. At instant 1b the current $I_{S1}$ changes its direction, since the magnetization flux in the core T1 reverses, whereby the diode D20 blocks and the capacitor C20 is charged. At instant 2 the transistor Q1 is rendered nonconducting and due to the influence of the magnetization current $I_m$ the voltage across the primary winding S1 and the choke coil L20 changes polarity with a rate which is determined by the capacitance of the capacitor C11. The change of polarity, which also takes place across the secondary winding S2 of the transformer biases the diode D1 in the forward direction. This means that the magnetization current $I_m$ is transmitted via the primary winding S1 to the secondary winding S2 and is fed via the diode D1 and the choke coil L1 to a load connected to the output of the converter. Since the magnetization current $I_m$ is substantially constant the current through the diode D1 will also be almost constant.

At instant 4 the core T1 will enter in its saturated condition, which means that the current demanded for the magnetization of the core rapidly increases and becomes greater than the magnetization current $I_m$. Due to the fact that the diode D1 does not immediately block, as described above, more current is flowing from the capacitor C2 in the backward direction through the diode D1 thereby magnetizing the core T1. When the diode D1 then blocks the magnetic energy thus stored in the transformer is so great that the polarity of the voltage across the choke coil L20 and the primary winding S1 very rapidly reverses despite that the magnetization current $I_m$ will oppose such a change of polarity. The voltage across the primary winding S1 thus becomes positive and at instant 1 the transistor Q1 is again rendered conducting without being subjected to overvoltages and collector losses since the collector-emitter voltage is low at this instant.

The converter of this specific embodiment could suitably be controlled in the same way as mentioned above viz making the time interval between instants 1b and 2 shorter, which is accomplished by rendering the transistor Q1 nonconducting earlier so that the voltage increase across the diode D20 will not reach the same value. The means value of the voltage $U_{D20}$ will thus become lower and since this voltage gives raise to the premagnetization current the latter will also decrease. A lower premagnetization means in turn that the mean value of the currents $I_c$ and $I_{D1}$ will be reduced and consequently even the output effect, which by means of a very simple change of the pulse width between instants 1 and 2 could be varied within a very wide range. A change of the mean value of the voltage across diode D20 could also be accomplished by varying the capacitance of the capacitor C20 or by connecting the diode D20 in parallel with resistances of different magnitude. Such a change of the voltage $U_{D20}$ will effect, in the same way as previously mentioned, a change of the output effect of the converter. The resistance in the circuit formed by the choke coil L20, the primary winding S1 and the diode D20 together with the eddy current losses in the choke coil L20 and the transformer T1 will determine the magnitude of the magnetization current. The output effect of the converter could thus be changed by varying one or several of these components.

Figure 15:
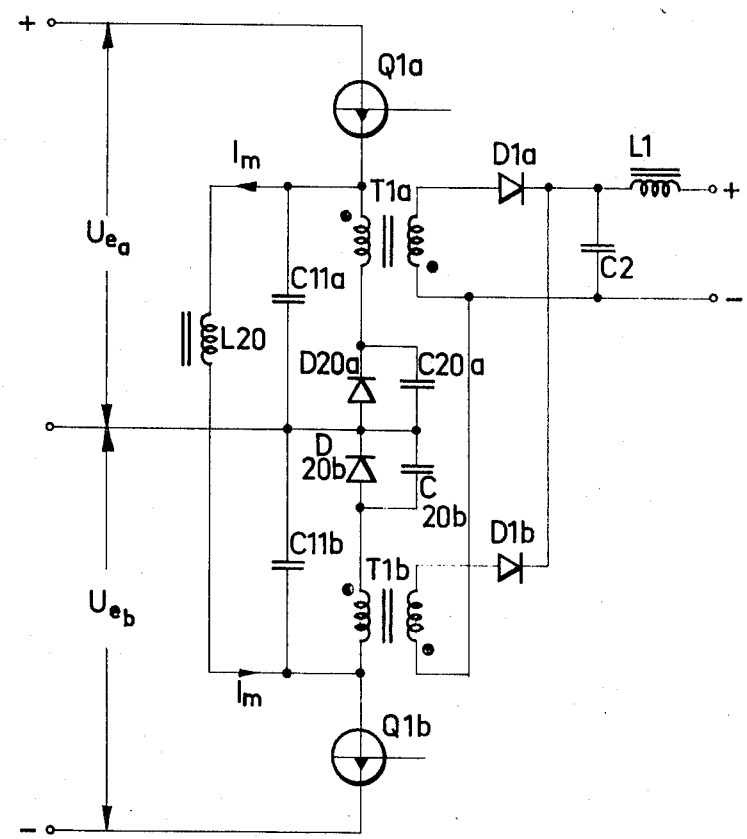
FIG. 15 is a suitable embodiment of a stationary DC converter in which two switching devices are push-pull operated.

FIG. 15 shows a suitable embodiment of the converter comprising two transistors Q1a and Q1b, which are operated with about 180° phase shift. Besides the advantage that the smoothing output filter becomes simpler and cheaper this embodiment only comprises one choke coil L20, which is serially connected with the two primary windings of the transformers T1a and T1b and the diodes D20a and D20b. In operation the terminals of the choke coil L20 will approximately have the same voltage, which means that the coil is subjected to a relatively low AC voltage meaning that its inductance could be made relatively low without risk for periodical variations occurring in the premagnetization current. This embodiment has thus the advantage that the premagnetization choke coil could be made smaller and consequently cheaper.

The converters so far described provide saturation of the transformer core T1. This is however not necessary, since one of the windings of the transformer T1 could be connected in parallel with a further choke coil which becomes saturated before the core T1. The function of a converter with this specific arrangement will be the same as the one previously described with the exception that the iron and copper losses in the transformer T1 due to its saturation will be avoided. Similar losses will of course occur in the further choke coil but this specific embodiment increases the possibilities to reduce or even eliminate these losses.

What we claim is:

1. In a device for a static DC converter comprising at least one switching means for intermittently connecting at least one DC source across the primary winding of at least one transformer to convert supplied DC voltage to an AC voltage of high frequency, said AC voltage of high frequency being transformed to suitable magnitude,
   at least one rectifying means on the secondary side of said transformer,
   means for premagnetizing a core of said transformer,
   said premagnetization means magnetizes said transformer core into saturation with a magnetizing field which is opposite to the magnetizing field generated by current through the corresponding switching means, causing said core to be in its saturated state when said corresponding switching means is rendered conductive and operative in said saturated state as the current through said switching means increases up to a predetermined value above which said transformer core will operate in its nonsaturated state,
   whereby the current through switching means will attain a substantially rectangular waveform,
   the improvement wherein a choke coil and at least one voltage source form a series circuit with the primary winding of the at least one transformer, said voltage source comprising at least one diode adapted to permit current to flow in the direction of the premagnetization current.

2. A device according to claim 1 in which a choke coil forms a series circuit with two primary windings of two transformers and two voltage sources comprised by two diodes, each being related to a corresponding switching means, being operated with a phase shift of about 180°.

3. A device according to claim 1 in which a choke coil is connected in parallel with any of the at least one transformer windings.

4. A device according to claim 2 in which a choke coil is connected in parallel with any of the at least one transformer windings.